United States Patent
Lee et al.

(10) Patent No.: US 11,822,074 B2
(45) Date of Patent: Nov. 21, 2023

(54) WEARABLE ELECTRONIC DEVICE IMPLEMENTING DISTRIBUTED SYSTEM FOR PROCESSING CONTENTS AND VISION

(71) Applicant: SAMSUNG ELECTRONICS CO., LTD., Suwon-si (KR)

(72) Inventors: Jinchoul Lee, Suwon-si (KR); Yongseob Yun, Suwon-si (KR); Juhwan Yun, Suwon-si (KR); Junmyeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/972,390

(22) Filed: Oct. 24, 2022

(65) Prior Publication Data

US 2023/0176371 A1 Jun. 8, 2023

Related U.S. Application Data

(63) Continuation of application No. PCT/KR2022/015808, filed on Oct. 18, 2022.

(30) Foreign Application Priority Data

Dec. 8, 2021 (KR) .................. 10-2021-0174486
Feb. 8, 2022 (KR) .................. 10-2022-0016203

(51) Int. Cl.
*G02B 27/00* (2006.01)
*G02B 27/01* (2006.01)
*H04W 4/80* (2018.01)

(52) U.S. Cl.
CPC ..... *G02B 27/0093* (2013.01); *G02B 27/0101* (2013.01); *G02B 27/017* (2013.01);
(Continued)

(58) Field of Classification Search
CPC ........... G02B 27/0101; G02B 27/0093; G02B 27/017; G02B 2027/0138;
(Continued)

(56) References Cited

U.S. PATENT DOCUMENTS 10,401,913 B2 * 9/2019 Mendoza ................ G06F 1/163
10,534,203 B2 1/2020 Olgun et al.
(Continued)

FOREIGN PATENT DOCUMENTS

CN 207637057 7/2018
KR 10-2014-0100658 8/2014
(Continued)

OTHER PUBLICATIONS

Search Report dated Feb. 10, 2023 in International Application No. PCT/KR2022/015808 and English-language translation.

*Primary Examiner* — Vinh T Lam
(74) *Attorney, Agent, or Firm* — Nixon & Vanderhye, P.C.

(57) ABSTRACT

An example wearable electronic device includes a frame, a first arm and a second arm extending from the frame, respectively, a screen display disposed in the frame, and including a display, at least one camera disposed in the frame, a first processor located in the first arm, and operatively connected to the display, and a second processor located in the second arm, and operatively connected to the at least one camera, the first processor may be configured to display contents on the screen display part using the display, and the second processor may be configured to perform an operation associated with the at least one camera.

20 Claims, 8 Drawing Sheets

(52) U.S. Cl.
CPC ......... *H04W 4/80* (2018.02); *G02B 2027/014* (2013.01); *G02B 2027/0138* (2013.01); *G02B 2027/0187* (2013.01)

(58) Field of Classification Search
CPC ...... G02B 2027/014; G02B 2027/0178; G02B 2027/0187; H04W 4/80
See application file for complete search history.

(56) References Cited

U.S. PATENT DOCUMENTS

| | | | |
|---|---|---|---|
| 10,860,070 | B2 | 12/2020 | Woods et al. |
| 10,950,205 | B2 | 3/2021 | Lee et al. |
| 11,099,397 | B2* | 8/2021 | Han .................... G02B 27/017 |
| 11,256,102 | B2* | 2/2022 | Carollo ............. G02B 27/0172 |
| 11,300,813 | B2* | 4/2022 | Rousseau ............... G02C 7/083 |
| 11,335,066 | B2 | 5/2022 | Ha et al. |
| 11,372,251 | B2* | 6/2022 | Isaacs ............... G02B 27/0176 |
| 11,415,818 | B2 | 8/2022 | Olgun et al. |
| 11,435,590 | B2* | 9/2022 | Moore .................. G06F 1/1681 |
| 11,570,931 | B2* | 1/2023 | Lei .......................... G06F 1/206 |
| 11,677,103 | B2* | 6/2023 | Pombo ................ G02B 27/017 345/8 |
| 2019/0011699 | A1* | 1/2019 | Moore ............... G02B 27/0101 |
| 2019/0033622 | A1 | 1/2019 | Olgun et al. |
| 2019/0187472 | A1 | 6/2019 | Choi et al. |
| 2020/0168177 | A1 | 5/2020 | Lee et al. |
| 2020/0264455 | A1 | 8/2020 | Olgun et al. |
| 2020/0393685 | A1* | 12/2020 | Isaacs ................ G02B 27/0176 |
| 2021/0055565 | A1* | 2/2021 | Moore ................... G02C 11/10 |
| 2021/0089095 | A1 | 3/2021 | Woods et al. |
| 2021/0110613 | A1 | 4/2021 | Ha et al. |
| 2022/0270336 | A1 | 8/2022 | Ha et al. |
| 2022/0357793 | A1* | 11/2022 | Hashimoto ........ G02B 27/0172 |
| 2022/0394889 | A1* | 12/2022 | Maric .................... H04N 23/54 |
| 2022/0413308 | A1* | 12/2022 | Jeon .......................... G01C 3/08 |

FOREIGN PATENT DOCUMENTS

| | | |
|---|---|---|
| KR | 10-2019-0072838 | 6/2019 |
| KR | 10-2020-0061930 | 6/2020 |
| KR | 10-2020-0103929 | 9/2020 |
| KR | 10-2021-0025835 | 3/2021 |
| KR | 10-2021-0044506 | 4/2021 |
| KR | 10-2021-0068200 | 6/2021 |
| WO | 2018/093917 | 5/2018 |

* cited by examiner

WEARABLE ELECTRONIC DEVICE IMPLEMENTING DISTRIBUTED SYSTEM FOR PROCESSING CONTENTS AND VISION

CROSS-REFERENCE TO RELATED APPLICATION(S)

This application is a continuation of PCT/KR2022/015808, filed on Oct. 18, 2022, at the Korean Intellectual Property Receiving Office and claims priority under 35 U.S.C. § 119 to Korean Patent Application No. 10-2021-0174486, filed Dec. 8, 2021, in the Korean Intellectual Property Office, and to Korean Patent Application No. 10-2022-0016203, filed Feb. 8, 2022, in the Korean Intellectual Property Office, the disclosures of each which are incorporated by reference herein in their entireties.

BACKGROUND

1. Field

The disclosure relates to a wearable electronic device implementing a distributed system for processing contents and a vision.

2. Description of Related Art

Wearable electronic devices, such as augmented reality (AR) glasses, which provide augmented realities (ARs), have been developed. The wearable electronic device may include a display provided in correspondence to two lenses for reproduction of contents and a plurality of cameras for identifying AR motions.

SUMMARY

A system associated with reproduction of contents of a wearable electronic device and a system for identifying AR motions may be implemented by a single system. In this case, power consumption may be concentrated at a location at which the single system is mounted, and a hot spot, at which emitted heat is concentrated at a peripheral portion of the single system, may be generated.

To remove the hot spot, an additional structure may be provided. However, a deviation of weight may be generated due to an additional heat dissipating structure. An additional structure for balancing the weight may be installed on an opposite side to remove the deviation of the weight. However, the additional structure for balancing the weight may increase the total weight of the wearable electronic device. A hot spot, weight imbalance, and a heavy weight of the wearable electronic device may degrade a comfort of wearing of a user.

Furthermore, because signal lines used in the wearable electronic device implementing the single system also are concentrated, it may be difficult to design various form factors of the wearable electronic device.

The disclosure provides an electronic device implementing a distributed system, by which a balance of a weight thereof may be maintained and an unnecessary increase of the weight may be prevented or reduced by removing a hot spot.

The wearable electronic device according to an embodiment may include a frame, a first arm and a second arm extending from the frame, respectively, a screen display disposed in the frame, and including a display, at least one camera disposed in the frame, a first processor located in the first arm, and operatively connected to the display, and a second processor located in the second arm, and operatively connected to the at least one camera, the first processor may be configured to display contents on the screen display using the display, and the second processor may be configured to perform an operation associated with the at least one camera.

The wearable electronic device according to an embodiment may include a frame, a first arm extending from a periphery portion of the frame in a first direction, a second arm extending from a periphery portion of the frame in an opposite direction to the first direction, a screen display disposed in the frame, and including a display, a plurality of sensors disposed in the frame, including a head tracking sensor and a gaze-tracking sensor, a first system that processes contents displayed on the screen display part, and a second system that processes a value detected by the sensors, and the first system may be disposed in the first arm and the second system may be disposed in the second arm.

According to the embodiments disclosed in the disclosure, emitted heat of an electronic device may be uniformly distributed and a hot spot may be removed through a distributed system for processing contents and a vision.

According to the embodiments disclosed in the disclosure, design restrictions due to a volume of the electronic device and a mounting space of signal lines may be reduced through the distributed system for processing contents and a vision.

According to the embodiments disclosed in the disclosure, a balance of the weight may be maintained without any unnecessary increase of the weight and a comfort of wearing of the user may be enhanced.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components may be marked by the same or similar reference numerals.

DETAILED DESCRIPTION

Hereinafter, various embodiments of the disclosure will be described with reference to the accompanying drawings. It will be recognized that modification, equivalent, and/or alternative on the various embodiments described herein can be variously made without departing from the scope and spirit of the disclosure.

Figure 1A:
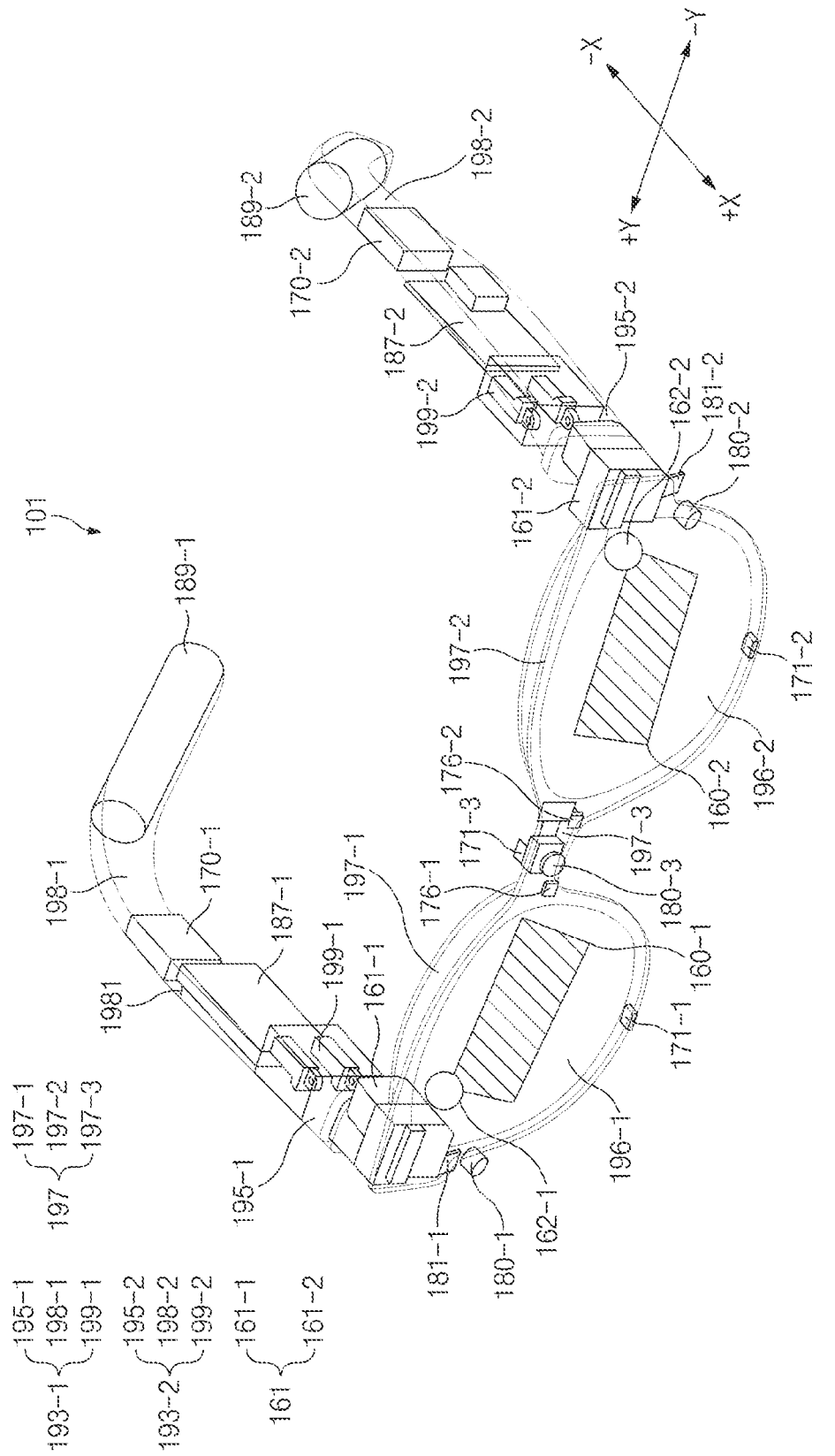
FIG. 1A is a schematic view of an example electronic device according to various embodiments.
Figure 1B:
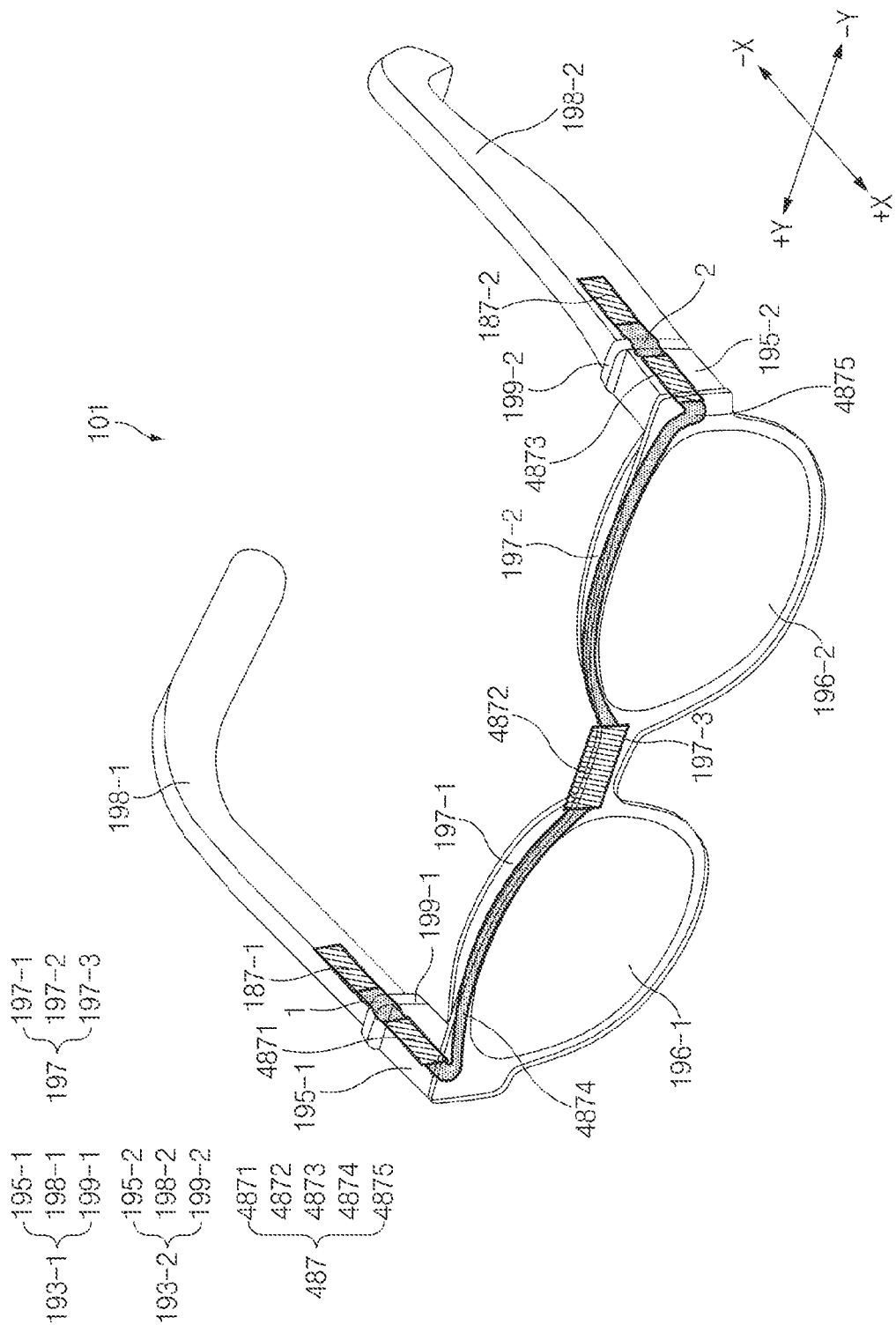
FIG. 1B is a schematic view of an example electronic device according to various embodiments.

FIG. 1A is a schematic view of an example electronic device 101 according to various embodiments. FIG. 1B is a schematic view of the example electronic device 101 according to various embodiments. In FIG. 1A, illustration of a third printed circuit board (PCB) 487 of FIG. 1B is omitted, but this is for convenience of description, and the disclosure is not limited to the embodiment illustrated in FIG. 1A or FIG. 1B. Similarly, in FIG. 1B, illustration of some configurations of the electronic device 101, except for the third PCB 487, is omitted.

In the examples of FIGS. 1A and 1B, the electronic device 101 may be referenced as a head mounted display (HMD) device, a wearable device, smart glasses, an eyewear, an augmented reality (AR) device, or a virtual reality (VR) device. The shape of the electronic device 101 illustrated in FIGS. 1A and 1B is by way of example, and the embodiments of the disclosure are not limited thereto.

Referring to FIG. 1A, the electronic device 101 (e.g., an electronic device 301 of FIG. 3) according to an embodiment may include a frame (or a frame structure) 197, a first arm 193-1, and a second arm 193-2. The frame 197 may include a first member 197-1, in which a first transparent member 196-1 is disposed, a second member 197-2, in which a second transparent member 196-2 is disposed, and a third member 197-3 that connects the first member 197-1 and the second member 197-2. At least some of the first member 197-1, the second member 197-2, and/or the third member 197-3 may be integrally formed, but the disclosure is not limited thereto. The first arm 193-1 and the second arm 193-2 may extend from the frame 197, respectively. For example, the first arm 193-1 may extend from a first side peripheral portion (e.g., a peripheral portion of the first member 197-1 in the +Y direction) of the first member 197-1, and the second arm 193-2 may extend from a second side peripheral portion (e.g., a peripheral portion of the second member 197-2 in the −Y direction) of the second member 197-2, which is opposite to the first side. The first arm 193-1 and the second arm 193-2 may be physically connected to the frame 197. For example, the first arm 193-1 may be connected to the first member 197-1, and the second arm 193-2 may be connected to the second member 197-2. When a user wears the electronic device 101, the frame 197 may be located on a front surface (e.g., the +X direction) of the head of the user, the first arm 193-1 may be located on a first side (e.g., the +Y direction) of the head of the user, and the second arm 193-2 may be located on a second side (e.g., the −Y direction) of the head of the user that is opposite to the first side. Furthermore, when the user wears the electronic device 101, the first member 197-1 of the frame 197 may correspond to the right eye of the user, and the second member 197-2 may correspond to the left eye of the user. Furthermore, the first arm 193-1 and the second arm 193-2 may support the frame 197 when the electronic device 101 is mounted.

In an embodiment, the first arm 193-1 may include a first sub-arm 195-1, a second sub-arm (or a first temple) 198-1, and a first hinge part 199-1. The first sub-arm 195-1 may be connected to the first member 197-1 of the frame 197. The second sub-arm 198-1 may be connected to the first sub-arm 195-1 to be rotatable through the first hinge part 199-1. For example, the second sub-arm 198-1 may be folded inwards with respect to the first sub-arm 195-1 or be spread outwards, in correspondence to an operation of the first hinge part 199-1. In an embodiment, the second arm 193-2 may include a third sub-arm 195-2, a fourth sub-arm (or a second temple) 198-2, and a second hinge part 199-2. The third sub-arm 195-2 may be connected to the second member 197-2 of the frame 197. The fourth sub-arm 198-2 may be connected to the third sub-arm 195-2 to be rotatable through the second hinge part 199-2. For example, the fourth sub-arm 198-2 may be folded inwards with respect to the third sub-arm 195-2 or be spread outwards, in correspondence to an operation of the second hinge part 199-2. In the disclosure, the frame 197, the first arm 193-1, and the second arm 193-2 may be referenced as a "housing" of the electronic device 101.

In an embodiment, at least a partial area of a surface of the housing of the electronic device 101 may include a sensing area for detecting a touch input by the user. For example, a surface 1981 of the first arm 193-1, which faces the first side (e.g., the +Y direction) may be at least partially used as the sensing area.

Figure 3:
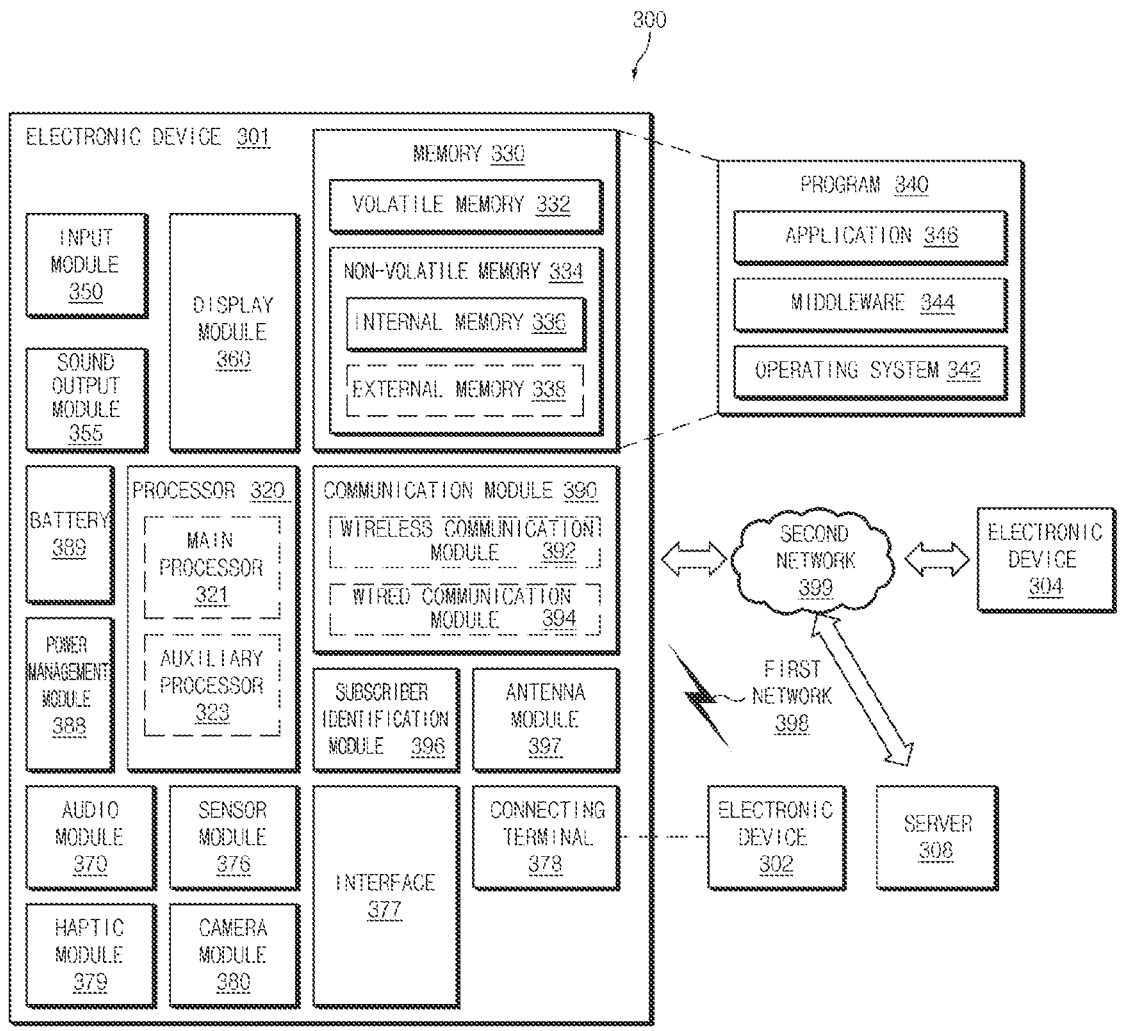
FIG. 3 is a block diagram of an example electronic device in a network environment according to various embodiments.

The electronic device 101 according to an embodiment may include a display 161 (e.g., a display module 360 of FIG. 3). For example, the electronic device 101 may include a first display 161-1 and/or a second display 161-2. The first display 161-1 may be disposed in the first member 197-1 of the frame 197 and/or the first sub-arm 195-1 of the first arm 193-1. The second display 161-2 may be disposed in the second member 197-2 of the frame 197 and/or the third sub-arm 195-2 of the second arm 193-2.

In an embodiment, the first display 161-1 and/or the second display 161-2 may include at least one of a liquid crystal display (LCD), a digital mirror device (DMD), a liquid crystal on silicon (LCoS) device, an organic light emitting diode (OLED), or a micro light emitting diode (micro LED). The display 161 of the electronic device 101 may include at least one light source for irradiating light. For example, when the first display 161-1 and/or the second display 161-2 includes one of a liquid crystal display device, a digital mirror device, or a silicon liquid crystal display device, the electronic device 101 may include at least one light source that irradiates light to a screen output area 160-1 and/or 160-2 of the display 161. In an embodiment, when the display 161 of the electronic device 101 generates light by itself, the display 161 may not include a separate light source other than a light source included in the display 161. For example, when the first display 161-1 and/or the second display 161-2 includes at least one of an organic light emitting diode or a micro LED, the electronic device 101 may provide an image to the user even though a separate light source is not included. Because a separate light source is not necessary when the display 161 is implemented by an organic light emitting diode or a micro LED, a weight of the electronic device 101 may be reduced.

The electronic device according to an embodiment may include the first transparent member 196-1 and the second transparent member 196-2. The first transparent member 196-1 may be at least partially accommodated in a window defined by the first member 197-1 of the frame 197. The second transparent member 196-2 may be at least partially accommodated in a window defined by the second member 197-2 of the frame 197. When the user wears the electronic device 101, the user may see through the first transparent member 196-1 and/or second transparent member 196-2. The first transparent member 196-1 and/or the second transparent member 196-2 may be formed of at least one of a glass plate, a plastic plate, or a polymer, and may be substantially transparent or translucent. When the electronic device 101 is mounted, the first transparent member 196-1 may be disposed to face the right eye of the user, and the second transparent member 196-2 may be disposed to face the left eye of the user.

In an embodiment, at least a portion of the first transparent member 196-1 and/or the second transparent member 196-2 may be a waveguide. The waveguide may deliver an image generated by the display 161 to the eyes of the user. The waveguide may be formed of glass, plastic, or a polymer. For example, the waveguide may include a nano pattern (e.g., a polygonal or curved grating structure) formed in an interior or on one surface thereof. The light that is input to one end of the waveguide may propagate in an interior of the waveguide by the nano pattern and may be provided to the eyes of the user. As an example, the waveguide including a free-form type prism may be configured to provide the input light to the user through a reflective mirror.

According to an embodiment, the waveguide may include at least one of at least one diffractive element (e.g., a diffractive optical element or a holographic optical element) or a reflective element (e.g., a reflective mirror). The waveguide may guide the light emitted from a light source to the eyes of the user using the at least one diffractive element or reflective element. For example, the diffractive element may include an input optical member (e.g., 162-1 and/or 162-2) and/or an output optical member (not illustrated). The first input optical member 162-1 and/or the second input optical member 162-2 may be referenced as, for example, an input grating area, and the output optical member (not illustrated) may be referenced, for example, as an output grating area. The input grating area may diffract or reflect the light to deliver the light output from a light source (e.g., a micro LED) to the transparent member (e.g., the first transparent member 196-1 and/or the second transparent member 196-2) of the screen display part. The output grating area may diffract or reflect the light delivered to the transparent member (e.g., the first transparent member 196-1 and/or the second transparent member 196-2) of the waveguide in a direction of the eyes of the user. For example, the reflective element may include a total-reflection optical element or a total-reflection waveguide for total internal reflection (TIR). The total internal reflection may be referenced as one scheme of guiding light, and may refer, for example, to an incident angle being made such that the light (e.g., the image) input through the input grating area is reflected on one surface of the waveguide (e.g., a specific surface) by 100% and the light is delivered to the output grating area by 100%. In an embodiment, a light path of the light emitted from the display 161 may be guided to the waveguide by the input optical member. The light that travels in the interior of the waveguide may be guided to the direction of the eyes of the user through the output optical member. The screen output area 160-1 and/or 160-2 may be determined based on the light emitted in the direction of the eyes.

FIG. 1A illustrates that the electronic device 101 provides an image to the user using the waveguide, but the embodiments of the disclosure are not limited thereto. For example, the display 161 of the electronic device 101 may be a transparent or translucent display. In this case, each of the first display 161-1 and the second display 161-2 may be disposed at a location (e.g., the first screen output area 160-1 and/or the second screen output area 160-2) that faces the eyes of the user. Furthermore, each of the first display 161-1 and the second display 161-2 may be disposed to at least partially overlap the first transparent member 196-1 and/or the second transparent member 196-2. For example, the first display 161-1 may be disposed on the first transparent member 196-1, or the first display 161-1 may be interposed between a plurality of layers of the first transparent member 196-1 when the first transparent member 196-1 includes a plurality of layers. Additionally or selectively, the second display 161-2 may be disposed on the second transparent member 196-2, or the second display 161-2 may be interposed between a plurality of layers of the second transparent member 196-2 when the second transparent member 196-2 includes a plurality of layers. In this disclosure, at least one of the input optical member 162, the transparent member 196, and the display 161, which outputs light to provide a screen that may be viewed by the user, and redirects the output light, may be referred to as a "screen display part" or "screen display".

According to an embodiment, the electronic device 101 may include at least one camera (e.g., a camera module 380 of FIG. 3). For example, the electronic device 101 may include a first camera 180-1, a second camera 180-2, and/or a third camera 180-3, which are disposed in the frame 197. The first camera 180-1 may be disposed in the first member 197-1 of the frame 197 to be adjacent to the first display 161-1. The second camera 180-2 may be disposed in the second member 197-2 of the frame 197 to be adjacent to the second display 161-2. The third camera 180-3 may be disposed in the third member 197-3 of the frame 197. Each of the first camera 180-1, the second camera 180-2, and the third camera 180-3 may include one or a plurality of cameras.

The first camera 180-1 and the second camera 180-2, for example, may be used to recognize an external image. The first camera 180-1 and the second camera 180-2 may be configured to acquire an image corresponding to a direction (e.g., the +X direction) corresponding to a gaze of the user who wears the electronic device 101. The electronic device 101 may perform head tracking (e.g., three or six degrees of freedom (DoF) tracking), hand image detection, hand image tracking, and/or space recognition) using the first camera 180-1 and the second camera 180-2. As an example, the first camera 180-1 and the second camera 180-2 may be global shutter (GS) cameras that have the same standard and performance (e.g., an angle of view, a shutter speed, a resolution, and/or the number of color bits). The electronic device 101 may support simultaneous localization and mapping (SLAM) technology by performing space recognition (e.g., space recognition of six degrees of freedom) and/or acquisition of depth information using stereo cameras disposed on the left and right sides. Furthermore, the electronic device 101 may recognize a gesture of the user using the stereo cameras disposed on the left and right sides. The electronic device 101 may detect fast hand motion and fine motion using the GS camera having small distortion as compared with a rolling shutter (RS) camera.

The third camera 180-3, for example, may be used for recognition of an external image. The third camera 180-3 may be configured to acquire an image corresponding to a direction (e.g., the +X direction) corresponding to a gaze of the user. In an embodiment, the third camera 180-3 may be a camera having a relatively high resolution as compared with the resolutions of the first camera 180-1 and the second camera 180-2. The third camera 180-3 may be referred to, for example, as a high resolution (HR) camera or a photo video (PV) camera. The third camera 180-3 may support functions for acquiring a high-quality image, such as auto focus (AF) and/or optical image stabilization (OIS). The third camera 180-3 may be a GS camera or an RS camera.

According to an embodiment, the electronic device 101 may include at least one gaze-tracking sensor (e.g., a sensor module 376 of FIG. 3). For example, the electronic device 101 may include a first gaze-tracking sensor 176-1 and/or a second gaze-tracking sensor 176-2. Each of the first gaze-tracking sensor 176-1 and the second gaze-tracking sensor 176-2, for example, may include at least one camera (e.g., a third camera 480-3 and a fourth camera 480-4 of FIG. 4) that is configured to acquire an image in a direction corresponding to the eyes of the user. The first gaze-tracking sensor 176-1 and the second gaze-tracking sensor 176-2 may be configured to acquire an image of the right pupil of the user and an image of the left pupil of the user, respectively. The electronic device 101 may be configured to detect the pupils of the user, based on the image of the pupils acquired using the first gaze-tracking sensor 176-1 and the second gaze-tracking sensor 176-2. For example, the electronic device 101 may detect a location (or a gaze) and a location change (or a gaze change) of the pupil of the user, based on an image of the pupil. The electronic device 101 may acquire a gaze (or data on the gaze) of the user, based on the image of the pupil of the user, and may display contents (e.g., an image) on the screen display part, based on the acquired gaze. For example, the electronic device 101 may display the image in the first transparent area 196-1 and/or the second transparent area 196-2 such that the image is located in the direction of the gaze of the user, using the display 161. As an example, the first gaze-tracking sensor 176-1 and the second gaze-tracking sensor 176-2 may be global shutter (GS) cameras that have the same standard and performance (e.g., an angle of view, a shutter speed, a resolution, and/or the number of color bits), but the disclosure is not limited in this respect.

According to various embodiments, the electronic device 101 may include at least one lighting unit. The lighting unit, for example, may include at least one LED. For example, the electronic device 101 may include a first lighting unit 181-1 and/or a second lighting unit 181-2. The first lighting unit 181-1 and the second lighting unit 181-2 may be disposed in the frame 197. For example, the first lighting unit 181-1 may be disposed in the first member 197-1 of the frame 197, and the second lighting unit 181-2 may be disposed in the second member 197-2 of the frame 197. The first lighting unit 181-1 and the second lighting unit 181-2 may be adjacent to the first camera 180-1 and the second camera 180-2, respectively. The first lighting unit 181-1 and the second lighting unit 181-2 may provide auxiliary lighting for the first camera 180-1 and the second camera 180-2, respectively. Although not illustrated, the electronic device 101 may include a third lighting unit disposed adjacent to the third camera 180-3. The third lighting unit may provide auxiliary lighting for the third camera 180-3.

In an example, the electronic device may include lighting units (not illustrated) disposed at peripheral portions of the first transparent member 196-1 and the second transparent member 196-2, respectively, in the frame 197. For example, each of the lighting units may be disposed in the third member 197-3 of the frame 197 to be adjacent to the first gaze-tracking sensor 176-1 and the second gaze-tracking sensor 176-2. Alternatively, each of the lighting units may be included in the first gaze-tracking sensor 176-1 and the second gaze-tracking sensor 176-2 to be implemented integrally. The lighting units are disposed to face the pupils of the user to provide lighting (e.g., light of a wavelength of an infrared ray) for allowing the first gaze-tracking sensor 176-1 and the second gaze-tracking sensor 176-2 to acquire a pupil image. The lighting units may include an LED that is configured to emit light of a wavelength of an infrared ray. Each of the first gaze-tracking sensor 176-1 and the second gaze-tracking sensor 176-2 may include an image sensor for acquiring an image of a wavelength of an infrared ray.

According to an embodiment, the electronic device 101 may include at least one battery (e.g., a battery 389 of FIG. 3). For example, the electronic device 101 may include a first battery 189-1 located at one end of the second sub-arm 198-1 and a second battery 189-2 located at one end of the fourth sub-arm 198-2. The first battery 189-1 and the second battery 189-2 may be configured to supply electric power to the elements of the electronic device 101.

According to an embodiment, the electronic device 101 may include at least one speaker (e.g., a sound output module 355 of FIG. 3). For example, the electronic device 101 may include a first speaker 170-1 and a second speaker 170-2. The first speaker 170-1 and the second speaker 170-2 may be disposed in the second sub-arm 198-1 and the fourth sub-arm 198-2, respectively. The electronic device 101 may be configured to provide stereo sounds using the speakers located on the left and right sides.

According to an embodiment, the electronic device 101 may include at least one microphone (e.g., an audio module 370 of FIG. 3). For example, the electronic device 101 may include a first microphone 171-1, a second microphone 171-2, and/or a third microphone 171-3. The first microphone 171-1, the second microphone 171-2, and the third microphone 171-3 may be disposed in the first member 197-1, the second member 197-2, and the third member 197-3 of the frame 197, respectively. For example, the first microphone 171-1 and the second microphone 171-2 may be disposed at lower ends of the first member 197-1 and the second member 197-2, respectively, but the disclosure is not limited in this respect.

Referring to FIGS. 1A and 1B, the electronic device 101 according to an embodiment may include a first PCB 187-1, a second PCB 187-2, and the third PCB 487. The first PCB 187-1 and the second PCB 187-2 may be disposed in a second sub-arm 198-1 of the first arm 193-1 and a fourth sub-arm 198-2 of the second arm 193-2 respectively. The first PCB 187-1 and the second PCB 187-2 may be electrically connected to other elements of the electronic device 101 through signal lines and/or a flexible PCB (FPCB). Each of the first PCB 187-1 and/or the second PCB 187-2 may be implemented by a substrate assembly including a plurality of PCBs and interposers disposed between the plurality of PCBs, but the disclosure is not limited in this respect.

In an embodiment, the third PCB 487 may be disposed in the first arm 193-1, the frame 197, and the second arm 193-2. The third PCB 487 may extend from the first arm 193-1 to the second arm 193-2 over the frame 197. For example, the third PCB 487 may extend along an outer surface of the housing, in the first arm 193-1, the frame 197, and the second arm 193-2. The third PCB 487 may at least partially include a flexible portion to be bent along a shape of the housing. For example, a fourth part 4874 of the third PCB 487 that extends from the first sub-arm 195-1 along a periphery of the first member 197-1 of the frame 197 may be formed flexibly. The fourth part 4874 may include a portion that is bent at a border between the first sub-arm 195-1 and the first member 197-1 and a portion that is bent along a shape of the first member 197-1. Furthermore, a fifth part 4875 of the third PCB 487 that extends from the third sub-arm 195-2 along a periphery of the second member 197-2 of the frame 197 may be formed flexibly. The fifth part 4875 may include a portion that is bent at a border between the third sub-arm 195-2 and the second member 197-2 and a portion that is bent along a shape of the second member 197-2.

In an embodiment, a first part 4871, a second part 4872, and a third part 4873 of the third PCB 487 may be formed rigidly. The first part 4871 and the second part 4872 may be located at opposite ends of the fourth part 4874, and may be connected to each other by the fourth part 4874. The first part 4871 may be connected to the first PCB 187-1 through a connection member 1 that passes through the first hinge part 199-1. The fifth part 4875 may be located between the second part 4872 and the third part 4873, and may connect the second part 4872 and the third part 4873. The third part 4873 may be connected to the second PCB 187-2 through a connection member 2 that passes through the second hinge part 199-2. The connection members 1 and 2 may be formed flexibly. For example, the connection members 1 and 2 may include a flexible printed circuit (e.g., a board-to-board connector) provided with electrical connection members (e.g., connectors) at opposite ends thereof, but the disclosure is not limited in this respect. As another example, the connection member 1 may be joined to the first PCB 187-1 not through a connector, but through a hot-bar scheme. As another example, the connection member 1 may include a flexible cable. The description of the above-described connection member 1 may be applied to the connection member 2 in the same way. In an embodiment, the connection members 1 and 2 may be bent to correspond to folding operations of the first hinge part 199-1 and the second hinge part 199-2.

In an embodiment, the elements of the electronic device 101, which are disposed in the first PCB 187-1 and the second PCB 187-2, may be operatively connected to the elements disposed in the frame 197, by a medium of the third PCB 487. This will be described in detail with reference to FIG. 4.

The above-described configurations of the electronic device 101 are by way of example, and the embodiments of the disclosure are not limited thereto. For example, the electronic device 101 may not include at least some of the elements described in relation to FIGS. 1A and 1B, or may further include other elements in addition to the above-described elements. For example, the electronic device 101 may include at least one of the elements of the electronic device 301 of FIG. 3, which will be described below. For example, the electronic device 101 may include at least one sensor (e.g., an acceleration sensor, a gyro sensor, and/or a touch sensor) and/or an antenna.

Figure 2:
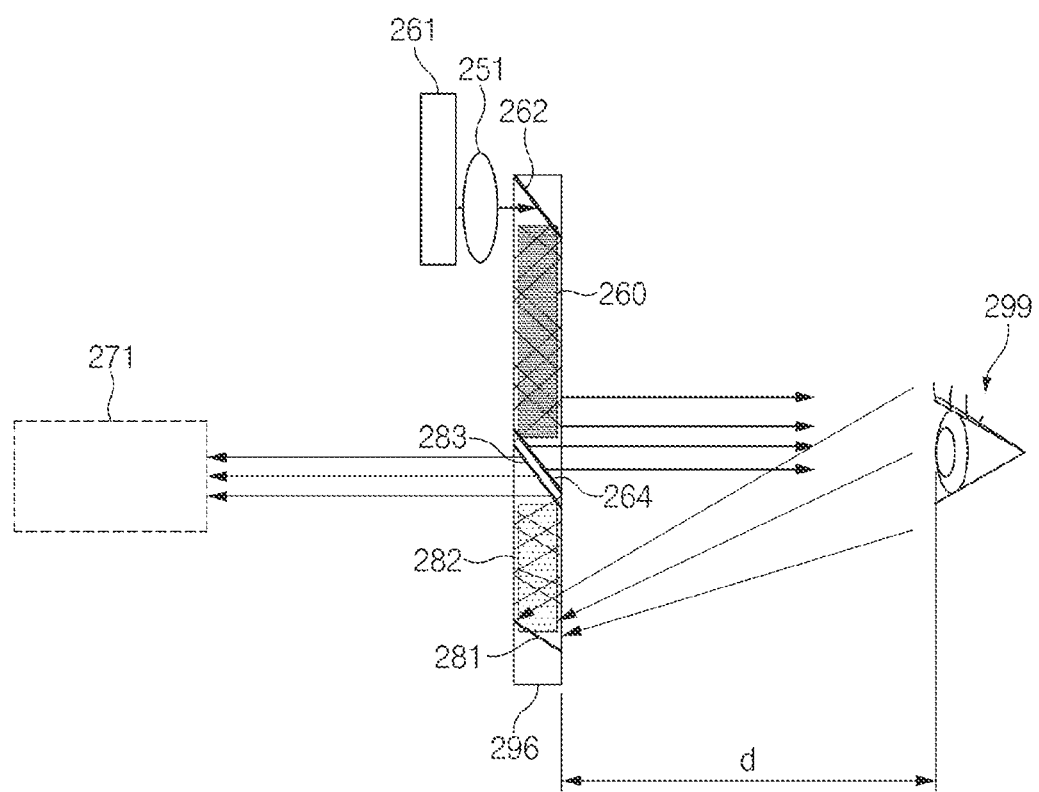
FIG. 2 is a schematic view of an example gaze-tracking and display method through a transparent member, according to various embodiments.

FIG. 2 is a schematic view of an example gaze-tracking and display method through the transparent member, according to various embodiments. Referring to FIG. 2, a display 261 (e.g., the display 161 of FIG. 1A) may provide an image to a transparent member 296 (e.g., the first transparent member 196-1 or the second transparent member 196-2 of FIG. 1A). According to an embodiment, the display 261 may input light corresponding to an image to an input optical member 262 (e.g., the first input optical member 162-1 or the second input optical member 162-2) through a lens 251. The input optical member 262 may reflect or diffract the input light to input the light to a waveguide 260. An output optical member 264 may output the light delivered through the waveguide 260 in a direction of eyes 299 of the user. In an embodiment, the lens 251 may be included in the display 261. In an example, a location of the lens 251 may be determined based on a distance between the transparent member 296 and the eyes 299 of the user.

A gaze-tracking sensor 271 (e.g., the first gaze-tracking sensor 176-1 or the second gaze-tracking sensor 176-2 of FIG. 1A) may acquire an image corresponding to at least one of the eyes 299 of the user. For example, the light corresponding to an image of the eye 299 of the user may be reflected and/or diffracted through a first splitter 281 and may be input to the waveguide 282. The light delivered to a second splitter 283 through the waveguide 282 may be reflected and/or diffracted by the second splitter 283 and may be output in a direction of the gaze-tracking sensor 271.

FIG. 3 is a block diagram illustrating an example electronic device 301 in a network environment 300 according to various embodiments. Referring to FIG. 3, the electronic device 301 in the network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In various embodiments, at least one of the components (e.g., the connecting terminal 378) may be omitted from the electronic device 301, or one or more other components may be added in the electronic device 301. In various embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to an embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 364 dB or less) for implementing mMTC, or U-plane latency (e.g., 0.5 ms or less for each of downlink (DL) and uplink (UL), or a round trip of 3 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of or including a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In an embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 4:
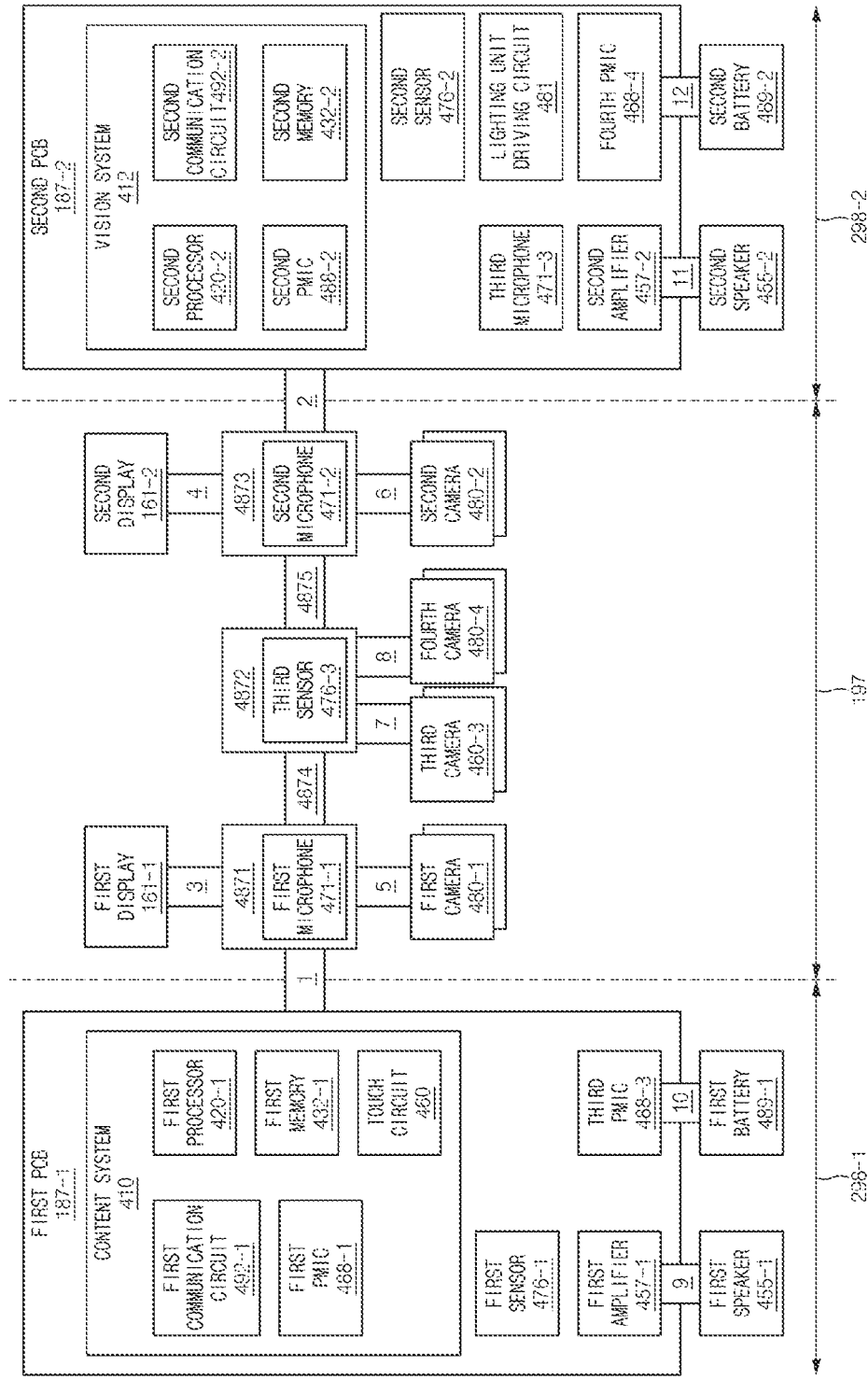
FIG. 4 illustrates an example of a distributed system for processing contents and a vision, which is implemented in an example electronic device according to various embodiments.

FIG. 4 illustrates an example of a distributed system for processing contents and a vision, which is implemented in an example electronic device according to various embodiments.

Referring to FIG. 4, an electronic device 401 according to an embodiment may include a content system 410 and a vision system 412. The content system 410 may include hardware(s), software(s), and/or a combination thereof, which is related to display contents on a screen display part of the electronic device 401. In an embodiment, the content system 410 may include a first memory 432-1, a first PMIC 488-1, a first communication circuit 492-1, a touch circuit 460, and a first processor 420-1 that is operatively or electrically connected thereto. Additionally, the electronic device 401 may include a third PMIC 488-3, a first amplifier 457-1, a first speaker 455-1, a first sensor 476-1, and a first battery 489-1.

In an embodiment, the first processor 420-1, the first PMIC 488-1, the first communication circuit 492-1, and the touch circuit 460 of the content system 410 may be disposed on the first PCB 187-1. The first processor 420-1 (e.g., a processor 320 of FIG. 3) may be electrically connected to the first display 161-1 and the second display 161-2. The first display 161-1 may be electrically connected to the first part 4871 of the third PCB 487 through a connection member 3, and the second display 161-2 may be electrically connected to the third part 4873 of the third PCB 487 through a connection member 4. The first part 4871 and the third part 4873 may be electrically connected to the first PCB 187-1 through the first connection member 1. The first processor 420-1 disposed in the first PCB 187-1 may be electrically connected to the first display 161-1 and the second display 161-2, through electrical paths provided by the first PCB 187-1, the third PCB 487, and the connection members 1, 3, and 4. The electrical paths may include a plurality of transmission lines formed of or including a conductive material. The plurality of transmission lines may be configured to transmit and receive a data signal according to a specific interface, for example, a display interface of a mobile industry processor interface (MIPI) standard, and a communication signal (or a control signal) according to an inter integrated circuit (I2C) or a serial peripheral interface (SIP).

In an embodiment, the first communication circuit 492-1 (e.g., a communication module 390 of FIG. 3) may include a wired communication circuit (e.g., a wired communication module 394 of FIG. 3) and/or a wireless communication circuit (e.g., a wireless communication module 392 of FIG. 3). When the first communication circuit 492-1 includes a wired communication circuit, a connector (e.g., a connection terminal 378 of FIG. 3) for providing a wired connection to the first PCB 187-1 may be additionally disposed. The first communication circuit 492-1 may be configured to transmit and receive a communication signal with an external device (e.g., an electronic device 302 and 304 or a server 308 of FIG. 3). For example, the first communication circuit 492-1 may transmit and receive a wireless signal with the external device through a wireless network (e.g., a first network 398 or a second network 399 of FIG. 3). As another example, the first communication circuit 492-1 may be configured to support a tethering connection with an external device by wire or wirelessly. The first processor 420-1 may receive data for outputting a screen on the display 161 using the first communication circuit 492-1.

The first PMIC 488-1 (e.g., a power management module 388 of FIG. 3) may manage electric power provided to the first processor 420-1. Furthermore, the first PMIC 488-1 and/or the third PMIC 488-3 may manage electric power provided to the elements disposed in the first PCB 187-1, for example, the first communication circuit 492-1, the touch circuit 460, the first sensor 476-1, and the first amplifier 457-1. The third PMIC 488-3 (e.g., the power management module 388 of FIG. 3) may be disposed in the first PCB 187-1 and may be electrically connected to the first battery 489-1 and the first processor 420-1. The third PMIC 488-3, for example, may include a fuel gauge integrated circuit (IC) for monitoring electric power of the first battery 489-1, and a charger IC including a limiter and an over-voltage protection IC. Alternatively or selectively, the third PMIC 488-3 may be integrated with the first PMIC 488-1. In this case, the first PMIC 488-1 may perform substantially the same function as that of the third PMIC 488-3. The first battery 489-1 (e.g., the battery 389 of FIG. 3) may be connected to the first PCB 187-1 through a connection member 10 and may provide electric power to the elements of the electronic device 401.

In an embodiment, the first amplifier 457-1 may be disposed in the first PCB 187-1. The first amplifier 457-1 may be electrically connected to the first processor 420-1. The first speaker 455-1 may be disposed in the first arm 193-1, and may be connected to the first PCB 187-1 through a connection member 9. The first speaker 455-1 may be electrically connected to the first amplifier 457-1. The first amplifier 457-1 may amplify an audio signal provided from the first processor 420-1 and may deliver the audio signal to the first speaker 455-1, and the first speaker 455-1 may output the provided audio signal. The first amplifier 457-1 and the first speaker 455-1 may be referred to, for example, as the sound output module 355 of FIG. 3.

In an embodiment, the first sensor 476-1 may be disposed in the first PCB 187-1, and may be electrically connected to the first processor 420-1. The first sensor 476-1, for example, may include an inertial measurement unit (IMU). The first processor 420-1 may perform a latest stage re-projection (LSR) operation, based on a value detected using the first sensor 476-1. Through this, a motion-to-photon that refers to a delay time until a screen is updated according to a motion (or a displacement of the electronic device 401) of the user may be reduced. Alternatively or selectively, the first sensor 476-1 may be disposed in the second PCB 187-2. The first sensor 476-1 disposed in the second PCB 187-2 may be electrically connected to a second processor 420-2, and an operation associated with the first sensor 476-1 may be performed by the second processor 420-2.

In an embodiment, the touch circuit (or a touch sensor IC) 460 may be configured to detect a touch input by the user. Although not illustrated, the touch circuit 460 may detect a touch input to a sensing area (e.g., the surface 1981 of the first arm 193-1 of FIG. 1A), and process the detected signal to provide the signal to the first processor 420-1. The first processor 420-1 may acquire information on a coordinate, a time, and a pressure of the touch input by the user, based on a signal provided from the touch circuit 460. Additionally, a sensor area for detecting a touch signal may be formed in the second arm 193-2 to be symmetrical to the sensor area formed in the first arm 193-1. In this case, another touch circuit (not illustrated) separate from the touch circuit 460 may be disposed in the second PCB 187-2, but the disclosure is not limited in this respect.

The vision system 412 may include hardware(s), software (s), and/or a combination thereof, which is related to detect information on the user of the electronic device 401. In an embodiment, the vision system 412 may include a second PMIC 488-2, a second communication circuit 492-2, a second memory 432-2, and the second processor 420-2 that is operatively or electrically connected thereto. Additionally, the electronic device 401 may include a fourth PMIC 488-4, a second amplifier 457-2, a second speaker 455-2, a second sensor 476-2, a second battery 489-2, and a lighting unit driving circuit 481.

In an embodiment, the second processor 420-2, the second PMIC 488-2, and the second communication circuit 492-2 of the vision system 412 may be disposed on the second PCB 187-2. The second processor 420-2 (e.g., the processor 320 of FIG. 3) may be electrically connected to at least one camera. For example, the second processor 420-2 may be electrically connected to the first to fourth cameras 480-1 to 480-4. The first camera 480-1 (e.g., the first camera 180-1 of FIG. 1A) may be connected to the first part 4871 of the third PCB 487 through a connection member 5. The second camera 480-2 (e.g., the second camera 180-2 of FIG. 1A) may be connected to the third part 4873 of the third PCB 487 through a connection member 6. The third camera 480-3 (e.g., the first gaze-tracking sensor 176-1 of FIG. 1A) and the fourth camera 480-4 (e.g., the second gaze-tracking sensor 176-2) may be connected to the second part 4872 of the third PCB 487, through connection members 7 and 8, respectively. The second processor 420-2 disposed in the second PCB 187-2 may be electrically connected to the first to fourth cameras 480-1 to 480-4, through electrical paths provided by the second PCB 187-2, the third PCB 487, and the connection members 5, 6, 7, and 8. The electrical paths may include a plurality of transmission lines formed of or including a conductive material. The plurality of transmission lines may be configured to transmit and receive a data signal according to a specific interface, for example, a camera interface of an MIPI standard, and a communication signal (or a control signal) according to I2C.

In an embodiment, the second communication circuit 492-2 (e.g., the communication module 390 of FIG. 3) may include a wired communication circuit (e.g., the wired communication module 394 of FIG. 3) and/or a wireless communication circuit (e.g., the wireless communication module 392 of FIG. 3). When the second communication circuit 492-2 includes a wired communication circuit, a connector (e.g., the connection terminal 378 of FIG. 3) for providing a wired connection to the second PCB 187-2 may be additionally disposed. The second communication circuit 492-2 may be configured to transmit and receive a communication signal with an external device (e.g., the electronic device 302 and 304 or the server 308 of FIG. 3). For example, the second communication circuit 492-2 may transmit and receive a wireless signal with the external device through a wireless network (e.g., the first network 398 or the second network 399 of FIG. 3). As another example, the second communication circuit 492-2 may be configured to support a tethering connection with an external device by wire or wirelessly. The second processor 420-2 may transmit values detected by the first to fourth cameras 480-1 to 480-4 or signals based thereon to the external device, using the second communication circuit 492-2.

In an embodiment, the second PMIC 488-2 (e.g., the power management module 388 of FIG. 3) may manage electric power provided to the second processor 420-2. Furthermore, the second PMIC 488-2 and/or the fourth PMIC 488-4 may manage electric power provided to the elements disposed in the second PCB 187-2, for example, the second communication circuit 492-2, the second sensor 476-2, a third microphone 471-3, the second amplifier 457-2, and the lighting unit driving circuit 481. The fourth PMIC 488-4 (e.g., the power management module 388 of FIG. 3) may be disposed in the second PCB 187-2 and may be electrically connected to the second battery 489-2 and the second processor 420-2. A scheme corresponding to the description made with reference to the second PMIC 488-2 may be applied to the fourth PMIC 488-4. For example, the fourth PMIC 488-4 may prevent or reduce overcharge of the second battery 489-2, and manage an output voltage and monitor a residual amount. Alternatively, the fourth PMIC 488-4 may be integrated with the second PMIC 488-2, and in this case, the second PMIC 488-2 may perform substantially the same function as that of the fourth PMIC 488-4. The second battery 489-2 (e.g., the battery 389 of FIG. 3) may be connected to the second PCB 187-2 through a connection member 12 and may provide electric power to the elements of the electronic device 401.

In an embodiment, the second amplifier 457-2 may be disposed in the second PCB 187-2. The second amplifier 457-2 may be electrically connected to the second processor 420-2. The second speaker 455-2 may be disposed in the second arm 193-2, and may be connected to the second PCB 187-2 through a connection member 11. A scheme corresponding to the description made with reference to the first amplifier 457-1 and the first speaker 455-1 may be applied to the second amplifier 457-2 and the second speaker 455-2. For example, the second amplifier 457-2 and the second speaker 455-2 may be referred to as the sound output module 355 of FIG. 3.

In an embodiment, the second sensor 476-2 may be disposed in the second PCB 187-2, and may be electrically connected to the second processor 420-2. The second sensor 476-2, for example, may include a proximity sensor. The second processor 420-2 may determine whether the electronic device 401 is mounted on the user, based on a value detected using the second sensor 476-2. In an embodiment, the second sensor 476-2 may be disposed in the first PCB 187-1, and may be controlled by the first processor 420-1. Selectively or alternatively, the electronic device 401 may not include the second sensor 476-2. In this case, the electronic device 401 may determine whether the electronic device 401 is mounted on the user, using at least one of the first to fourth cameras 480-1 to 480-4.

In an embodiment, the lighting unit driving circuit 481 may be disposed in the second PCB 187-2, and may be electrically connected to the second processor 420-2. The lighting unit driving circuit 481 may drive a first IR LED and a second IR LED (not shown). The first IR LED may be disposed adjacent to the third camera 480-3, and may be connected to the third PCB 487 through the connection member 7. The second IR LED may be disposed adjacent to the fourth camera 480-4, and may be connected to the third PCB 487 through the connection member 8. Through the third PCB 487, an electric power signal for driving the first IR LED and the second IR LED may be provided. Furthermore, through the third PCB 487, a control signal for operating the first IR LED and the second IR LED may be provided. The control signal may be provided from the lighting unit driving circuit 481. The first IR LED and the second IR LED may emit IR light for allowing the third camera 480-3 and the fourth camera 480-4 to detect a gaze of the user. In an embodiment, the first IR LED and the second IR LED may be integrated with the third camera 480-3 and the fourth camera 480-4.

In an embodiment, the third microphone 471-3 may be disposed in the second PCB 187-2, and may be electrically connected to the second processor 420-2. In an embodiment, like the third microphone 171-3 of FIG. 1A, the third microphone 471-3 may be disposed in the second part 4872 of the third PCB 487 or may be disposed in the third member 197-3 of the frame 197. In an embodiment, the third microphone 471-3 may be disposed in the first PCB 187-1, and may be electrically connected to the first processor 420-1.

In an embodiment, the first processor 420-1 of the content system 410 may execute instructions stored in the first memory 432-1 (e.g., a memory 330 of FIG. 3). The electronic device 401 may control the content system 410 by executing the instructions stored in the first memory 432-1 using the first processor 420-1.

The second processor 420-2 (e.g., the processor 320 of FIG. 3) of the vision system 412 may execute instructions stored in a second memory 432-2 (e.g., the memory 330 of FIG. 3). The electronic device 401 may control the vision system 412 by executing the instructions stored in the second memory 432-2 using the second processor 420-2.

In an embodiment, the content system 410 and the vision system 412 may be operated independently. Selectively, a transmission line for synchronizing the content system 410 and the vision system 412 may be provided. The transmission line, for example, may electrically connect the first processor 420-1 and the second processor 420-2, and communication may be performed between the first processor 420-1 and the second processor 420-2 through the transmission line. The transmission line may be implemented through a separate cable that passes through the third PCB 487 or the frame 197. The transmission line may be configured to support an interface protocol, such as an SPI, a universal asynchronous receiver transmitter (UART), or a universal serial bus (USB), but is not limited to the above examples.

Hereinafter, operations of the example vision system 412 and the example content system 410 will be described with reference to FIG. 5. Hereinafter, it will be described that a method for processing contents and a vision of a distributed system implemented in the electronic device 401 is performed by the vision system 412 and the content system 410, but the disclosure is not limited thereto, and it will be understood that the content processing method may performed by the electronic device 401 or the first processor 420-1 and the vision processing method may be performed by the electronic device 401 or the second processor 420-2.

Figure 5:
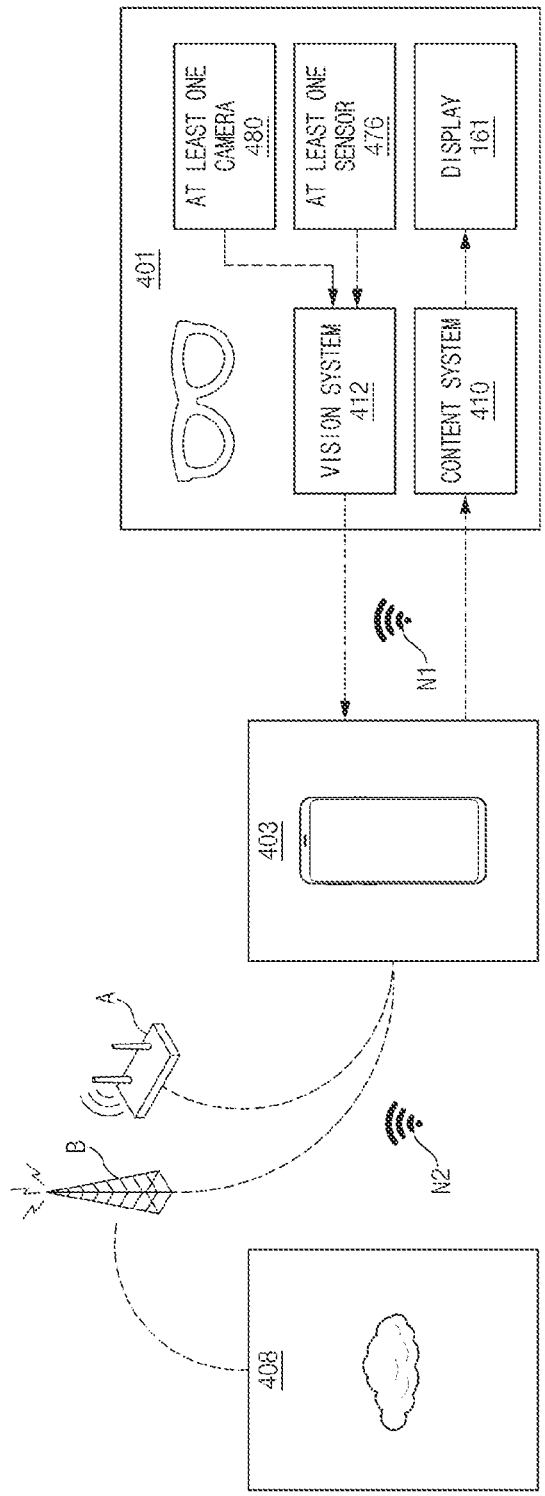
FIG. 5 is a schematic view illustrating a method for processing contents and a vision by a distributed system implemented in an example electronic device according to various embodiments.

FIG. 5 is a schematic view illustrating the method for processing contents and a vision by the distributed system implemented in the example electronic device according to various embodiments. Referring to FIG. 5, the vision system 412 according to an embodiment may acquire at least one image using at least one camera 480 (e.g., the first to fourth cameras 480-1 to 480-4 of FIG. 4). The vision system 412 may perform a user head-tracking and gaze-tracking operation, based on the acquired at least one image and a value detected using the at least one sensor 476 (e.g., the first to third sensors 476-1 to 476-3 of FIG. 4). The vision system 412 may acquire first data (or first information) on a motion of a gaze and second data (or second information) on a motion of the head of the user. Furthermore, the vision system 412 may acquire third information on an external object using the at least one camera 480 and the at least one sensor 476. For example, the third information may include information on a location of the external object (e.g., a TV) and tracking information on a speed and a direction of the external object with respect to the electronic device 401. The vision system 412 may transmit at least one of the first information, the second information, or the third information to an external electronic device 403. For example, the vision system 412 may transmit at least one of the first information, the second information, or the third information to the external electronic device 403 through a first communication network N1 established using the second communication circuit 492-2. Furthermore, the vision system 412, selectively, may transmit information on contents of an application (or an application that is being executed in a foreground) executed in the electronic device 401 to the external electronic device 403, together with the at least one of the information. In an embodiment, the first communication network N1 may include the first network 398 of FIG. 3 or the second network 399 of FIG. 3. Additionally, the first communication network N1 may include a wired/wireless tethering connection between the electronic device 401 and the external electronic device 403.

In an embodiment, the external electronic device 403 may acquire screen information by rendering contents based on data (or information) received from the electronic device 401. For example, the external electronic device 403 may render contents related to the external object, based on the third information on the external object, which is received from the electronic device 401. The contents, for example, may include a visual object that represents information (e.g., a specification of a TV) related to an external object and/or a control menu (e.g., a menu for allowing the user to access a webpage, in which a TV may be purchased) related to the external object, but the disclosure is not limited to the above-described example. The visual object may be displayed to be adjacent to the external object or at least partially overlap the external object on the screen display part, but the disclosure is not limited thereto. The contents to be displayed may be rendered not by the external electronic device 403 but by a server 408 (e.g., a cloud server). In this case, the external electronic device 403 may transmit the data received from the electronic device 401 to the server 408, through a second communication network N2. The screen information acquired by the server 408 may be transmitted from the server 408 to the external electronic device 403 through the second communication network N2, and the external electronic device 403 may transmit the screen information to the electronic device 401. Furthermore, unlike the illustration, the external electronic device 403 may be omitted, and the acquired data on the motion of the user and the screen information based on thereto may be transmitted and received, between the electronic device 401 and the server 408, through the first communication network N1 or the second communication network N2.

The second communication network N2, for example, may include a short-range communication network (e.g., the first network 398 of FIG. 3), such as Wi-Fi, which is established through a wireless access point "A". As another example, the second communication network N2 may include a 4th generation (4G), 5th generation (5G), or next-generation cellular network (e.g., the second network 399 of FIG. 3), which is established through a base station "B".

In an embodiment, the content system 410 may receive screen information on the contents to be displayed, from the external electronic device 403 or the server 408. For example, the content system 410 may receive the screen information using the first communication circuit 492-1. In an embodiment, the content system 410 may display contents on the screen display part, based on the received screen information.

In an embodiment, the content system 410 may detect a motion of the user, while the contents are being displayed on the screen display part. For example, the content system 410 may detect a motion of the user and/or the external object using the first sensor 476-1 (or the first sensor 476-1 and a third sensor 476-3). For example, the content system 410 may detect a value of a posture of the electronic device 401 using the first sensor 476-1, and may determine whether the posture of the electronic device 401 is changed, based on the detected value. In this case, the content system 410 may determine that there is a motion of the user (or the electronic device 401 mounted on the user). In an embodiment, when a motion of the user and/or the external object is detected while the contents are displayed on the screen display part, the screen information received from the external electronic device 403 may be corrected based on the detected motion information (e.g., the fourth information). The content system 410 may output the corrected screen information on the screen display part. In an embodiment, the information on the motion of the user and/or the external object may be acquired by the vision system 412. In this case, the vision system 412 may transmit the motion information and a message that requests rendering such that the screen information is renewed based on the motion information, to the external electronic device 403 or the server 408. The external electronic device 403 or the server 408 may perform the rendering by renewing the contents, in response to the message received from the electronic device 401. The external electronic device 403 or the server 408 may acquire the renewed screen information. The vision system 412 may receive the renewed screen information from the external electronic device 403 or the server 408, and may display the renewed contents on the screen display part based thereon.

The wearable electronic device (e.g., the electronic device 101 of FIG. 1A) according to an embodiment may include a frame (e.g., the frame 197 of FIG. 1A), a first arm (e.g., the first arm 193-1 of FIG. 1A) and a second arm (e.g., the second arm 193-2 of FIG. 1A) extending from the frame, respectively, a screen display part (e.g., at least one of the input optical member 162, the transparent member 196, and the display 161 of FIG. 1A) disposed in the frame, and including a display, at least one camera (e.g., the camera module 380 of FIG. 3) disposed in the frame, a first processor (e.g., the first processor 420-1 of FIG. 4) located in the first arm, and operatively connected to the display, and a second processor (e.g., the second processor 420-2 of FIG. 4) located in the second arm, and operatively connected to the at least one camera, the first processor may be configured to display contents on the screen display part using the display, and the second processor may be configured to perform an operation associated with the at least one camera.

The second processor may be configured to, using the at least one camera, acquire at least one of first information on a direction of a gaze of a user, second information on a direction of movement of the head of the user, or third information on a location of an external object.

The wearable electronic device may include a second communication circuit (e.g., the second communication circuit 492-2 of FIG. 4) electrically connected to the second processor, and located in the second arm, and the second processor may be configured to transmit at least one of the first information, the second information, or the third information to an external electronic device (e.g., the external device 403 of FIG. 5) using the second communication circuit.

The electronic device may include a first communication circuit (e.g., the first communication circuit 492-1 of FIG. 4) electrically connected to the first processor, and located in the first arm. The first processor may be configured to receive screen information from the external electronic device using the first communication circuit, and the screen information may be information that is acquired by rendering data associated with the contents, based on at least one of the first information, the second information, or the third information received from the wearable electronic device.

The screen information may be acquired by the external electronic device or a server (e.g., the server 408 of FIG. 5) that establishes wireless communication with the external electronic device.

The first processor may be configured to display the contents on the screen display part, based on the received screen information.

The wearable electronic device may include at least one sensor (e.g., the first sensor 476-1 of FIG. 4) electrically connected to the first processor, and the first processor may be configured to detect a value for a posture of the wearable electronic device using the at least one sensor, and determine whether the posture of the wearable electronic device is changed, based on the detected value, while the contents are displayed on the screen display part.

The first processor may be configured to, when the posture of the wearable electronic device is changed while the contents are displayed on the screen display part, acquire fourth information on the changed posture of the wearable electronic device based on the value detected by the at least one sensor, and correct the contents displayed on the screen display part, based on the acquired fourth information.

The first processor may be configured to, when the posture of the wearable electronic device is changed while the contents are displayed on the screen display part, acquire fourth information on the changed posture of the wearable electronic device based on the value detected by the at least one sensor, transmit the fourth information to the external electronic device using the first communication circuit, and transmit a message that requests renewal of the screen information based on the fourth information to the external electronic device, using the first communication circuit.

The wearable electronic device may include a first printed circuit board (PCB) (e.g., the first PCB 187-1 of FIG. 1B) disposed in the first arm, and a second PCB (e.g., the second PCB 187-2 of FIG. 1B) disposed in the second arm, the first processor may be disposed in the first PCB, and the second processor may be disposed in the second PCB.

The wearable electronic device may include a third PCB (e.g., the third PCB 487 of FIG. 1B) extending from the first arm to the second arm along a periphery of the frame, including at least partially flexible portion, and electrically connected to the first PCB and the second PCB. The display may be electrically connected to the first processor through the third PCB, and the at least one camera may be electrically connected to the second processor through the third PCB.

The wearable electronic device (e.g., the electronic device 101 of FIG. 1A) according to an embodiment may include a frame (e.g., the frame 197 of FIG. 1A), a first arm (e.g., the first arm 187-1 of FIG. 1A) extending from a periphery portion of the frame in a first direction, a second arm (e.g., the second arm 187-2 of FIG. 1A) extending from a periphery portion of the frame in an opposite direction to the first direction, a screen display part (e.g., at least one of the input optical member 162, the transparent member 196, and the display 161 of FIG. 1A) disposed in the frame, and including a display, a sensor part (e.g., the at least one camera 480 and/or the at least one sensor 476 of FIG. 5) disposed in the frame, and including a head-tracking sensor (e.g., the first camera 180-1 and the second camera 180-2 of FIG. 1A) and a gaze-tracking sensor (e.g., the first gaze-tracking sensor 176-1 and the second gaze-tracking sensor 176-2 of FIG. 1A), a first system (e.g., the content system 410 of FIG. 4) that processes contents displayed on the screen display part, and a second system (e.g., the vision system 412 of FIG. 4) that processes a value detected by the sensor part, and the first system may be disposed in the first arm and the second system may be disposed in the second arm.

The first system may include a receiver (e.g., the first communication circuit 492-1 of FIG. 4) that receives a wireless signal, and a first processor (e.g., the first processor 420-1 of FIG. 4) operatively connected to the receiver and the display, and the second system may include a transmitter (e.g., the second communication circuit 492-2 of FIG. 4) that transmits a wireless signal, and a second processor (e.g., the second processor 420-2 of FIG. 4) operatively connected to the transmitter and the sensor part.

The second processor may be configured to acquire first information on a direction of a gaze of a user and second information on a direction of movement of the head of the user, based on a value detected using the sensor part.

The second processor may be configured to provide the first information and the second information to an external electronic device using the transmitter, and provide third information on the contents that are to be provided through the display to the external electronic device using the transmitter.

The first processor may be configured to receive screen information from the external electronic device using the receiver, and the screen information may be information that is acquired by rendering data associated with the contents, based on the first information, the second information, and the third information received from the wearable electronic device.

The first processor may be configured to display the contents on the screen display part, based on the received screen information.

The wearable electronic device may include at least one sensor (e.g., the first sensor 476-1 of FIG. 4) separate from the sensor part and electrically connected to the first processor, and the first processor may be configured to detect whether a posture of the wearable electronic device is changed, using the at least one sensor, while the contents are displayed on the screen display part.

The first processor may be configured to, when the posture of the wearable electronic device is changed while the contents are displayed on the screen display part, acquire fourth information on the changed posture of the wearable electronic device using the at least one sensor, and correct the contents displayed on the screen display part, based on the acquired fourth information.

The first processor may be configured to, when the posture of the wearable electronic device is changed while the contents are displayed on the screen display part, acquire fourth information on the changed posture of the wearable electronic device using the at least one sensor, transmit the fourth information to the external electronic device using the transmitter, and transmit a message that requests renewal of the screen information based on the fourth information to the external electronic device, using the transmitter.

Figure 6:
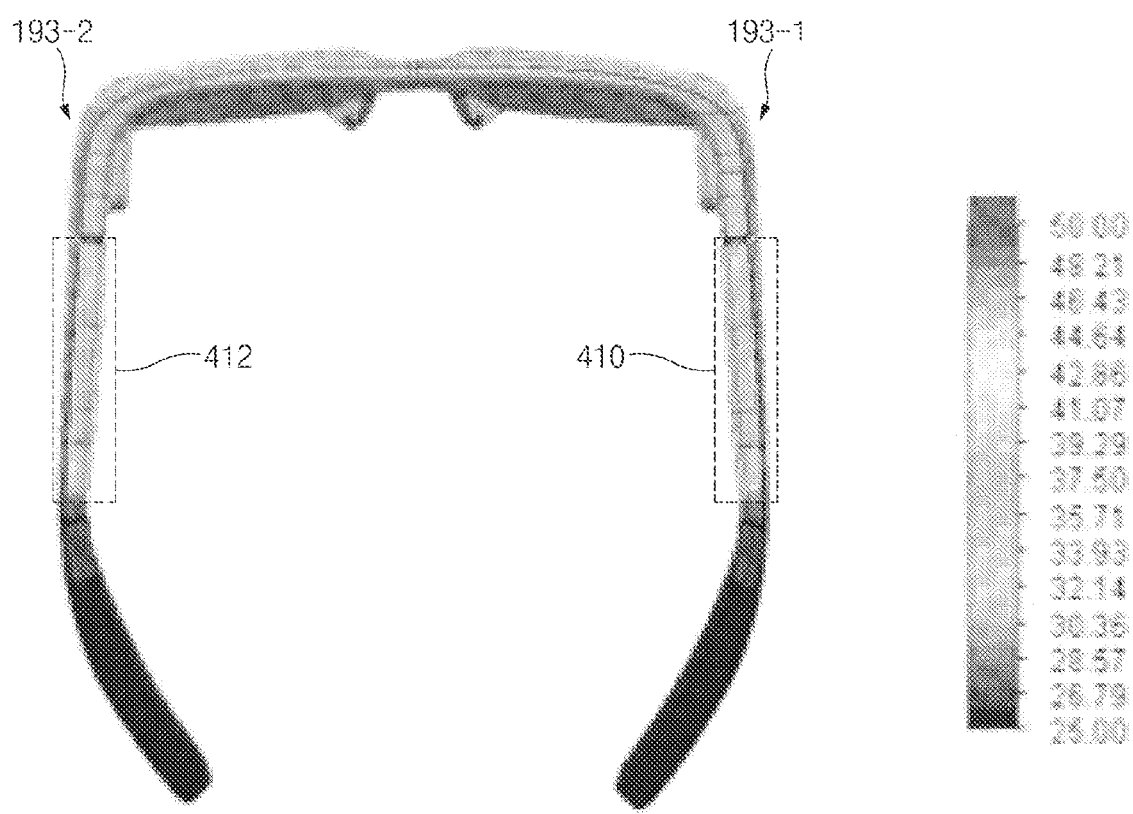
FIG. 6 illustrates a heat emission temperature of an example electronic device implementing a distributed system according to various embodiments.
Figure 7:
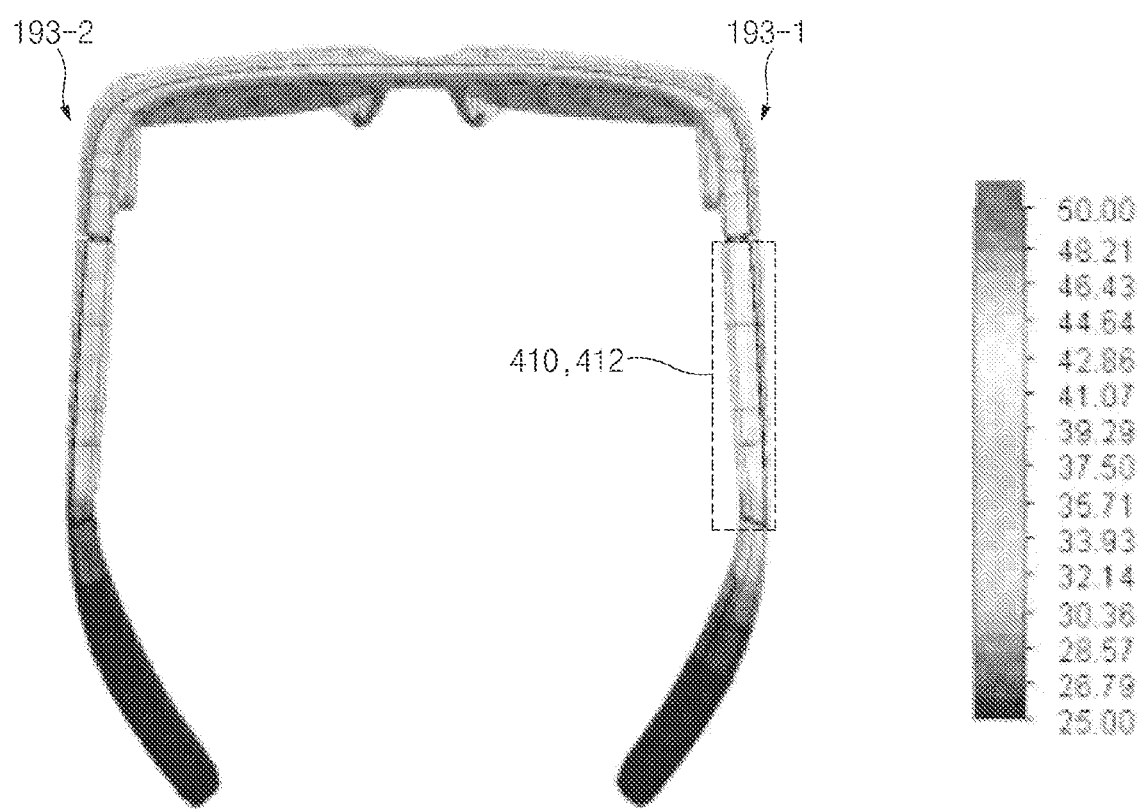
FIG. 7 illustrates a heat emission temperature of an electronic device, according to a comparative example.

FIG. 6 illustrates a heat emission temperature of an example electronic device implementing the distributed system according to various embodiments. FIG. 7 illustrates a heat emission temperature of an electronic device, according to a comparative example.

Referring to FIG. 6, because the content system 410 and the vision system 412 are distributed in the first arm 193-1 and the second arm 193-2, the heat emitted in the electronic device according to various embodiments may be uniformly distributed as a whole. This is because a current consumption of the content system 410 and a current consumption of the vision system 412 are similar. For example, the power consumption of the first processor 420-1 of the content system 410 may be about 300 mW, and the power consumption of the first communication circuit 492-1 may be about 250 mW. The power consumption of the second processor 420-2 of the vision system 412 on an opposite side may be about 550 mW. Furthermore, signal lines required by the content system 410 and the vision system 412 are distributed in the first arm 193-1 and the second arm 193-2, a design restriction due to a volume and a mounting space of the electronic device 401 may be reduced, and signal interferences that may be caused by signal lines of high densities may be reduced.

Referring to FIG. 7, in an electronic device 701 according to the comparative example, both of the content system 410 and the vision system 412 may be disposed in the first arm 193-1. In this case, a temperature of the first arm 193-1 may be higher than that of the second arm 193-2. Accordingly, to reduce a deviation of emitted heat, the electronic device 701 according to the comparative example may require a separate heat dissipating structure in the first arm 193-1, and thus may degrade a comfort of wearing due to an increase and a deviation of the weight thereof. Furthermore, to solve the deviation of the weight due to the heat dissipating structure, the electronic device 701 according to the comparative example may require an additional structure for balancing the weight in the second arm 193-2.

Because the electronic device 401 according to various embodiments does not require a heat dissipating structure that is required in the above-described comparative example, an unnecessary increase of the weight may be prevented. Furthermore, the electronic device 401 according to an embodiment may maintain a balance of the weight even though there is no additional structure for balancing the weight, which is required in the above-described comparative example, and a comfort of wearing may be enhanced without any unnecessary increase of the weight.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A wearable electronic device comprising:
    a frame;
    a first arm and a second arm extending from the frame, respectively;
    a screen display disposed in the frame, and including a display;
    at least one camera disposed in the frame;
    a first processor located in the first arm, and operatively connected to the display; and
    a second processor located in the second arm, and operatively connected to the at least one camera,
    wherein the first processor is configured to:
        display contents on the screen display using the display, and
    wherein the second processor is configured to:
        perform an operation associated with the at least one camera.

2. The wearable electronic device of claim 1, wherein the second processor is configured to, using the at least one camera, acquire at least one of:
    first information on a direction of a gaze of a user;
    second information on a direction of movement of a head of the user; or
    third information on a location of an external object.

3. The wearable electronic device of claim 2, comprising:
    a second communication circuit electrically connected to the second processor, and located in the second arm,
    wherein the second processor is configured to:
        transmit at least one of the first information, the second information, or the third information to an external electronic device using the second communication circuit.

4. The wearable electronic device of claim 3, comprising:
    a first communication circuit electrically connected to the first processor, and located in the first arm,
    wherein the first processor is configured to:
        receive screen information from the external electronic device using the first communication circuit, and
    wherein the screen information comprises information acquired by rendering data associated with the contents, based on at least one of the first information, the second information, or the third information received from the wearable electronic device.

5. The wearable electronic device of claim 4, wherein the screen information is acquired by the external electronic device or a server that establishes wireless communication with the external electronic device.

6. The wearable electronic device of claim 4, wherein the first processor is configured to:
    display the contents on the screen display, based on the received screen information.

7. The wearable electronic device of claim 6, comprising:
    at least one sensor electrically connected to the first processor,
    wherein the first processor is configured to:
        detect a value for a posture of the wearable electronic device using the at least one sensor; and
        determine whether the posture of the wearable electronic device is changed, based on the detected value, while the contents are displayed on the screen display.

8. The wearable electronic device of claim 7, wherein the first processor is configured to:
    when the posture of the wearable electronic device is changed while the contents are displayed on the screen display,
        acquire fourth information on the changed posture of the wearable electronic device based on the value detected by the at least one sensor; and
        correct the contents displayed on the screen display, based on the acquired fourth information.

9. The wearable electronic device of claim 7, wherein the first processor is configured to:
when the posture of the wearable electronic device is changed while the contents are displayed on the screen display,
acquire fourth information on the changed posture of the wearable electronic device based on the value detected by the at least one sensor;
transmit the fourth information to the external electronic device using the first communication circuit; and
transmit a message that requests renewal of the screen information based on the fourth information to the external electronic device, using the first communication circuit.

10. The wearable electronic device of claim 1, comprising:
a first printed circuit board (PCB) disposed in the first arm; and
a second PCB disposed in the second arm,
wherein the first processor is disposed in the first PCB, and
wherein the second processor is disposed in the second PCB.

11. The wearable electronic device of claim 10, comprising:
a third PCB extending from the first arm to the second arm along a periphery of the frame, including at least partially flexible portion, and electrically connected to the first PCB and the second PCB,
wherein the display is electrically connected to the first processor through the third PCB, and
wherein the at least one camera is electrically connected to the second processor through the third PCB.

12. A wearable electronic device comprising:
a frame;
a first arm extending from a periphery portion of the frame in a first direction;
a second arm extending from a periphery portion of the frame in an opposite direction to the first direction;
a screen display disposed in the frame, and including a display;
a plurality of first sensors disposed in the frame, and the plurality of first sensors including a head-tracking sensor and a gaze-tracking sensor;
a first system configured to process contents displayed on the screen display; and
a second system configured to process a value detected by the first sensors,
wherein the first system is disposed in the first arm and the second system is disposed in the second arm.

13. The wearable electronic device of claim 12,
wherein the first system includes:
a receiver configured to receive a wireless signal; and
a first processor operatively connected to the receiver and the display, and
wherein the second system includes:
a transmitter configured to transmit a wireless signal; and
a second processor operatively connected to the transmitter and the first sensors.

14. The wearable electronic device of claim 13, wherein the second processor is configured to:
acquire first information on a direction of a gaze of a user and second information on a direction of movement of the head of the user, based on a value detected using the first sensors.

15. The wearable electronic device of claim 14, wherein the second processor is configured to:
provide the first information and the second information to an external electronic device using the transmitter; and
provide third information on the contents to be provided through the display to the external electronic device using the transmitter.

16. The wearable electronic device of claim 15, wherein the first processor is configured to:
receive screen information from the external electronic device using the receiver, and
wherein the screen information comprises information acquired by rendering data associated with the contents, based on the first information, the second information, and the third information received from the wearable electronic device.

17. The wearable electronic device of claim 16, wherein the first processor is configured to:
display the contents on the screen display, based on the received screen information.

18. The wearable electronic device of claim 17, comprising:
at least one second sensor different from the plurality of first sensors and electrically connected to the first processor,
wherein the first processor is configured to:
detect whether a posture of the wearable electronic device is changed, using the at least one second sensor, while the contents are displayed on the screen display.

19. The wearable electronic device of claim 18, wherein the first processor is configured to:
when the posture of the wearable electronic device is changed while the contents are displayed on the screen display part,
acquire fourth information on the changed posture of the wearable electronic device using the at least one second sensor; and
correct the contents displayed on the screen display, based on the acquired fourth information.

20. The wearable electronic device of claim 18, wherein the first processor is configured to:
when the posture of the wearable electronic device is changed while the contents are displayed on the screen display,
acquire fourth information on the changed posture of the wearable electronic device using the at least one second sensor;
transmit the fourth information to the external electronic device using the transmitter; and
transmit a message that requests renewal of the screen information based on the fourth information to the external electronic device, using the transmitter.

* * * * *